H. W. ABBOTT.
TRANSMISSION LOCK.
APPLICATION FILED MAY 31, 1917.
1,318,040.
Patented Oct. 7, 1919.
2 SHEETS—SHEET 2.
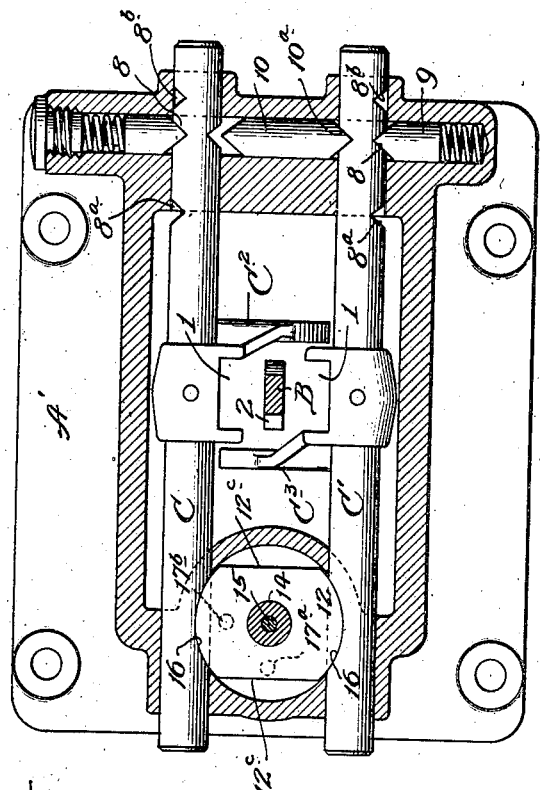
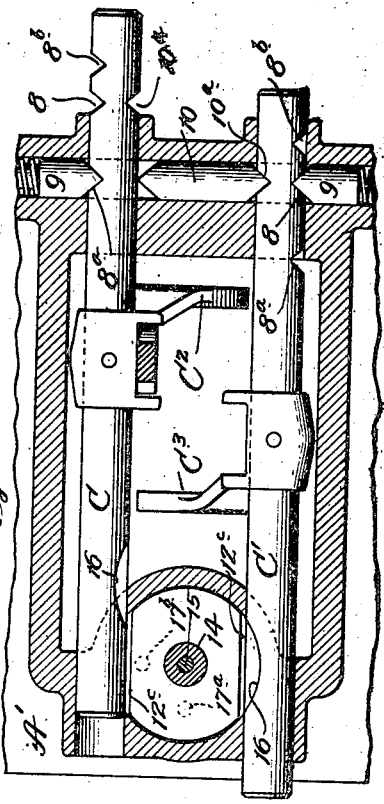
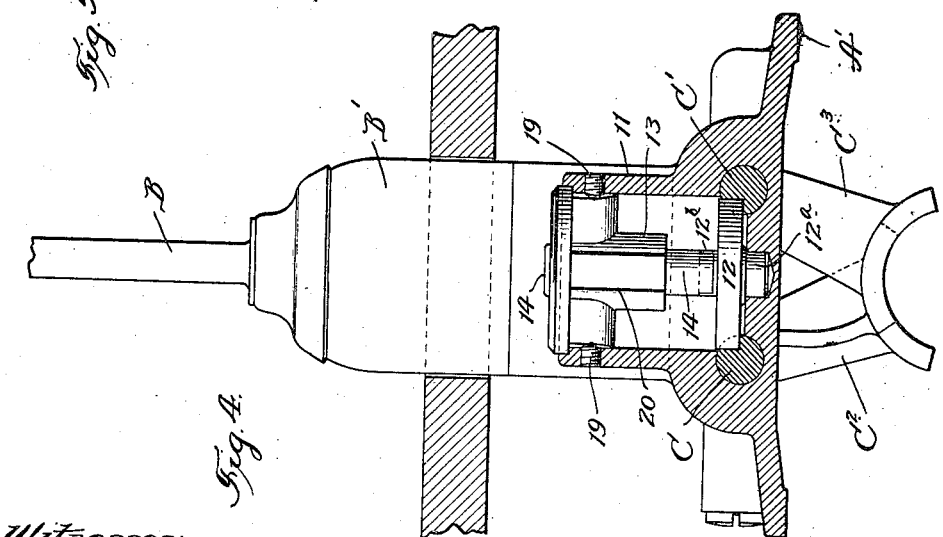
Witnesses:
Inventor:
Harry W. Abbott,
By Dyrenforth, Lee, Chritton and Wiles
Attys.

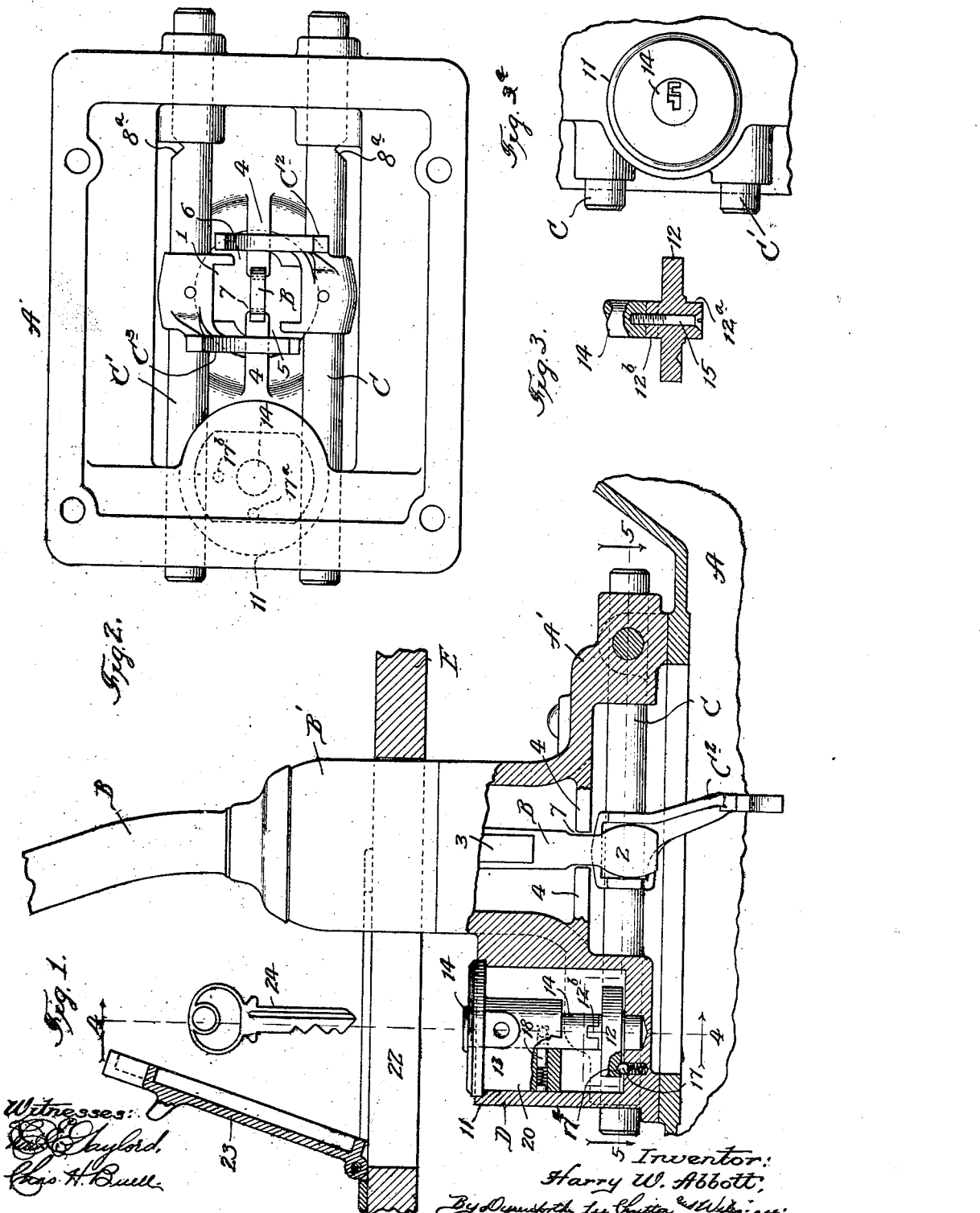

UNITED STATES PATENT OFFICE.

HARRY W. ABBOTT, OF CHICAGO, ILLINOIS.

TRANSMISSION-LOCK.

1,318,040.   Specification of Letters Patent.   Patented Oct. 7, 1919.

Application filed May 31, 1917. Serial No. 171,936.

*To all whom it may concern:*

Be it known that I, HARRY W. ABBOTT, a citizen of the United States, residing at Chicago, in the county of Cook and State of Illinois, have invented a new and useful Improvement in Transmission-Locks, of which the following is a specification.

This invention relates particularly to locking devices adapted to prevent the theft of automobiles or the like; and the primary object is to provide means for locking the transmission, which is simple in construction and thoroughly effective for its purpose.

The invention is illustrated in its preferred embodiment in the accompanying drawings, in which—

Figure 1 represents a broken vertical sectional view of the gear-casing of an automobile and the gear-shifting mechanism, equipped with the improved locking device; Fig. 2 represents a bottom plan view of the removable top of the gear-casing, upon which the gear-shifting lever is mounted, and which is equipped also with the improved locking device; Fig. 3, a broken vertical sectional view showing the connection between the locking disk employed and the key-controlled spindle which serves to actuate said locking disk; Fig. 3$^a$, a plan view of the lock employed; Fig. 4, a transverse vertical sectional view taken as indicated at line 4 of Fig. 1; Fig. 5, a horizontal sectional view taken as indicated at line 5 of Fig. 1 and showing the gear-shifting rods, or members of the gear-shifting couple, locked in neutral position; and Fig. 6, a similar view showing the gear-shifting rods unlocked and one of the rods shifted to a different position.

In the embodiment illustrated, A represents the gear-box of an ordinary sliding gear transmission of an automobile; A', the removable cover-plate of the gear-box; B, a gear-shifting lever mounted on the cover-plate A' in a universal bearing B' of well-known construction; C, C', a pair of gear-shifting rods, or the members of a gear-shifting couple, reciprocably mounted in the cover-plate, said rods being equipped, respectively, with depending gear-shifting yokes C$^2$, C$^3$, which are adapted to engage the annular grooves with which the hubs of the sliding-gears are commonly provided; D, the improved locking means with which the cover-plate A' is equipped; and E, one of the floor-boards of the automobile-body, through which the gear-shifting lever B and its mounting extend.

In the illustration given, the gear-box is that of a type of transmission where the gear-casing is located beneath the foot-board in front of the operator's seat and immediately back of the fly-wheel of the engine.

The members C, C', of the gear-shifting couple are in the form of rods, or bars, which are capable of being reciprocated rearwardly and forwardly in longitudinal guides with which the cover-plate A' is provided. The gear-shifting yokes C$^2$ and C$^3$ are rigidly attached to the rods C and C', and are provided with recesses 1 adapted to be engaged by the lower end 2 of the gear-shifting lever B. The mounting B' for the gear-shifting lever is in the form of a hollow boss which rises from the cover-plate, and in which the lever is mounted in a universal bearing. The lever is held in neutral position by leaf-springs 3 which bear against the sides of the lower portion of the lever, in the usual manner. Projecting into the chamber in which the lower portion of the lever works are longitudinal tongues 4 which divide the chamber into longitudinal channels 5 and 6, which are connected by a cross-slot 7 disposed between the ends of the tongues 4. In the neutral position, the lever B is held, by the springs 3, with its lower end-portion disposed in the cross-slot 7.

As is well understood, the lower end of the lever may be swung into engagement with the socket, or recess, 1, of either gear-shifting yoke, and the corresponding slide-rod may be shifted in either direction, according to the speed desired.

Each of the slide-rods C, C', is provided on its outer side with an intermediate notch 8, and with additional notches 8$^a$ and 8$^b$. The plate A' is fitted with spring-held pawls 9 adapted to engage said notches. The plate A' is further equipped with a double-acting pawl 10, which is disposed between the rods C and C' and adapted to engage notches 10$^a$, with which the rods are provided at their inner sides at points corresponding with the neutral position of the rods. In Fig. 5, the pawls 9 yieldingly lock the slide-rods C and C' in the neutral position, in which position the rods are so situated as to be capable of being interlockingly engaged by a key-controlled locking member, with which the locking device D is provided. Fig. 5 shows the rods locked by the member just referred to. The pawls 9 and 10 are the devices commonly employed for yieldingly locking the gear-shifting rods in selected positions. The pawl 10 serves to lock either one of the rods against actuation when the other rod is shifted. This is well understood.

The locking device D, in the construction shown, comprises a vertical chamber 11 formed in a boss cast integrally with the plate A' and disposed in the rear of the lever-mounting B'; a locking disk 12 journaled in the lower portion of said chamber adapted to interlockingly engage the gear-shifting rods C and C'; a lock-casing 13 permanently secured in the chamber 11 above the disk 12; and a key-controlled actuating spindle 14 extending through the casing 13 and connected with and serving to actuate the disk 12.

The disk 12, which is confined so as to be nonwithdrawable axially is provided at its lower side with a short journal 12ª which is received in a bearing provided in the bottom of the chamber 11; and the upper side of the disk is provided with a tenon 12ᵇ which fits in a socket with which the lower end of the spindle 14 is provided. The parts are held together by an axially-disposed screw 15, as shown in Fig. 3.

The gear-shifting members C and C' are provided at the upper portions of their inner sides with segmental recesses 16, with which the interposed disk 12 engages when the members C and C' are in the neutral position and the member 12 is so turned as to engage therewith. The member 12 is cut away, or provided at opposite sides with plane faces 12ᶜ, so that the disk will clear or be free from engagement with the rods when the disk is in the position shown in Fig. 6. The bottom of the chamber 11 is shown provided (Figs. 1 and 6) with a spring-held locking pawl, or ball, 17, which is adapted to engage recesses 17ª and 17ᵇ, which correspond with the locking and non-locking positions, respectively, of the disk 12. When the pawl 17 engages the recess 17ᵇ, the disk 12 is yieldingly held in the non-locking position, thus permitting freedom of movement of the rods C and C' in the gear-shifting operations. The recess 17ª is unnecessary, but may be employed if desired. This recess corresponds with the locking position of the disk 12, but it is to be observed that when the disk 12 is in the locking position, the spindle 14 which is rigidly attached thereto is secured against rotation in the lock-casing 13 by the usual tumblers employed in a lock of the pin type, one of such tumblers being indicated at 18 in Fig. 1.

The lock-casing 13 is shown secured in the chamber 11 by means of screws 19 which are ground off flush with the outer wall of the boss which forms the chamber 11, as shown in Fig. 4. Any other means of permanently securing the lock-casing in position may be adopted. The lock-casing is also provided with the usual vertical boss 20, in which the tumblers 18 (one shown) are disposed. These tumblers project into the key-slot of the barrel, or spindle, 14, and are retracted when the key is inserted, thus enabling the spindle 14 to be rotated through the medium of a key, and thus actuate the disk 12.

In Fig. 1, the floor-board E is shown provided with a perforation through which the boss B' projects, and this opening is extended to provide a passage 22 which gives access to the lock. The passage 22 may be closed by means of a hinged plate 23 applied to the board E. A key 24 of the Yale type may be employed for unlocking the spindle 14 and rotating it. By this means the disk 12 may be rotated to a non-locking position, and the key may be allowed to remain in the lock beneath the closure 23. When it is desired to lock the machine, the spindle may be rotated through the medium of the key to throw the disk 12 to the locking position shown in Fig. 5, after which the key may be removed, and the spindle will be locked to the lock-casing 13 by means of the pawl or tumblers, 18.

It will be noted from Fig. 5 that the sides 12ᶜ of the disk project somewhat beyond the recesses 16, with which the rods C and C' are provided, consequently if an effort is made to shift one of said rods by means of the hand-lever B, the effect will be to cause a binding between the disk 12 and the gear-shifting rods. The significance of this is that the strain exerted through the medium of the lever B is taken care of at the disk 12, so that no undue strain will be placed upon the tumblers 18 of the lock, and the lock will not be injured. It is preferred to case-harden or temper the disk 12, so that it will withstand hard usage without injury.

The construction described is simple, well adapted to its purpose, and may be provided at moderate cost. Its use is preferably provided for in the manufacture of a machine by casting the chamber 11 integral with the cover-plate A' and recessing the rods C and C' to accommodate the locking disk. Preferably the spindle 14 is actuated directly by the key which serves to release it from the lock-casing. In any event, the member serves as a key-controlled actuating member, through the medium of which the locking disk 12 is turned to lock or release the gear-shifting members C and C'.

The foregoing detailed description has been given for clearness of understanding only, and no unnecessary limitation should be understood therefrom, but the appended claims should be construed as broadly as permissible in view of the prior art.

What I regard as new, and desire to secure by Letters Patent, is:

1. In a device of the character set forth, the combination of a pair of reciprocably-mounted parallel gear-shifting rods provided on adjacent sides with segmental recesses, an interposed axially non-withdrawable rotary locking disk having two sides cut away, said disk being adapted, when turned to one position, to directly engage said recesses, and, when turned to another position, to clear said rods, and key-controlled means for turning said disk.

2. The combination with a gear casing plate, a pair of parallel gear-shifting rods mounted therein, and an actuating lever for said rods mounted on said plate, said plate being provided with a vertical chamber having a bottom disposed in the plane of said rods, of an axially non-withdrawable rotary locking member journaled in the bottom of said chamber, said locking member being adapted, when turned to one position, to directly engage and lock said rods, and, when turned to another position, to clear said rods, a spindle adapted to rotate said locking member, means for locking said spindle against rotation, and a key adapted to release said spindle and effect rotation thereof.

3. In an apparatus of the kind described, two reciprocating rods adapted to throw the mechanism into and out of engagement, said rods being provided with adjacent cavities, a part adapted to rotate in a bearing about an axis midway between said rods and extending at right angles to a plane through the axes of said rods and so formed that when turned in one position it shall enter both of said cavities and when turned in another position shall be withdrawn therefrom, and means for locking said part in its engaged position.

4. In a device of the character set forth, the combination of a pair of reciprocably-mounted parallel gear-shifting rods provided on adjacent sides with segmental recesses, an interposed locking disk having two sides cut away, an actuating spindle for said disk, means for locking said spindle against rotation, and a key adapted to release said spindle and effect rotation thereof.

HARRY W. ABBOTT.